(12) United States Patent
Nakata et al.

(10) Patent No.: US 6,652,604 B1
(45) Date of Patent: Nov. 25, 2003

(54) ALUMINUM ELECTROLYTIC CAPACITOR AND ITS MANUFACTURING METHOD

(75) Inventors: Takumi Nakata, Yamaguchi (JP); Katsuya Fujimoto, Yamaguchi (JP); Yoshio Mikami, Asa-gun (JP); Tadahiro Nakamura, Osaka (JP); Kazuya Kawahara, Uji (JP); Yoshio Hirata, Yamaguchi (JP); Tsuyoshi Yoshino, Kameoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/390,709

(22) Filed: Sep. 7, 1999

(30) Foreign Application Priority Data

Sep. 7, 1998 (JP) .............................. 10-252395

(51) Int. Cl.$^7$ ................................. H01G 9/00
(52) U.S. Cl. ...................... 29/25.03; 361/509
(58) Field of Search ................ 29/25.03; 361/502, 361/503, 504, 508, 509, 516, 517, 518, 520, 523, 529, 535, 536

(56) References Cited

U.S. PATENT DOCUMENTS 3,854,196 A  * 12/1974  Derrick et al. ............. 29/25.03
5,240,166 A     8/1993  Fontana, Jr. et al. ...... 228/111.5

FOREIGN PATENT DOCUMENTS

| EP | 0 350 220 A2 | 6/1989 |
| EP | 0 394 093 A1 | 4/1990 |
| EP | 0 398 760 A1 | 5/1990 |
| EP | 0 831 502 A1 | 9/1995 |
| JP | 7-235453 | 9/1995 |
| JP | 8-111355 | 4/1996 |

* cited by examiner

*Primary Examiner*—Wael Fahmy
*Assistant Examiner*—Ginette Peralta
(74) *Attorney, Agent, or Firm*—Parkhurst & Wendel, L.L.P.

(57) ABSTRACT

The object of the present invention is to provide an aluminum electrolytic capacitor and its manufacturing method. The aluminum electrolytic capacitor of the present invention comprises a capacitor element formed by winding an electrode foil, at least an anode foil of which is structured so as to have part of the surface thereof made free of an oxide film and connected with a lead. The capacitor element is placed in a bottomed metal case together with a driving electrolyte, thereby achieving low resistance, a reduction in size, high ripple-current carrying and low loss characteristics entirely due to perfect connection between the electrode foil and the lead.

13 Claims, 8 Drawing Sheets

ALUMINUM ELECTROLYTIC CAPACITOR AND ITS MANUFACTURING METHOD

FIELD OF THE INVENTION

The present invention relates to an aluminum electrolytic capacitor used in various electronic equipment and particularly relates to an aluminum electrolytic capacitor realizing high ripple current-carrying capacity and high reliability performance and a manufacturing method thereof.

BACKGROUND OF THE INVENTION

Smaller sizes and enhanced reliability are required of electronic equipment nowadays. Therefore, aluminum electrolytic capacitors must be smaller in size, larger in ripple current-carrying capacity and more reliable in performance. FIG. 6 is a cross-sectional view of a prior art aluminum electrolytic capacitor. As shown in FIG. 6, the anode foil 1 and cathode foil 2, are each connected with the aluminum part 3a of the lead 3, and wound together with the separator 4 sandwiched therebetween, to form a capacitor element 5. Capacitor element 5 is placed with a driving electrolyte (not shown in FIG. 5) in a bottomed tubular metal case 6 and an opening of the metal case 6 is sealed with a sealing material 7, thus completing an aluminum electrolytic capacitor.

With the prior art aluminum electrolytic capacitor as shown in FIG. 6, an oxide film 1a with a high melting point and high insulating properties is formed on the surface of the anode foil 1, as shown in FIGS. 7a and 7b. Therefore, it has been impossible to use a conventional electrical or thermal process welding method, to weld a lead connecting area 1b of the anode foil 1 with the aluminum part 3a of the lead 3 because of the oxide film 1a. 7(b) is first destroyed and welded using such special connecting methods as an ultrasonic welding method, a swaging joint method and a cold welding method as shown in FIG. 8 to FIG. 10, respectively. (See Japanese Laid Open Patent Application No. H7-235453, for example).

More specifically, the ultrasonic welding method of FIG. 8 is a method, whereby the oxide film 1a is destroyed by ultrasonic energy and then both the anode foil 1 and lead 3 are joined together. The swaging joint method of FIG. 9 is a method whereby the oxide film 1a is destroyed by a swaging needle and then anode foil 1 and lead 3 are joined together. And the cold welding method of FIG. 10 is a method, whereby the oxide film 1a is destroyed by a pressing pressure received from a press tip. These methods aim to join the lead connecting area 1b of the anode foil 1 with the aluminum part 3a of the lead 3 by bringing both into a direct contact with each other.

With the foregoing prior art electrolytic capacitor, the lead connecting area 1b of an aluminum layer of the anode foil 1 (referred to as aluminum 1b hereafter) and the aluminum part 3a of the lead 3 (referred to as aluminum 3a hereafter) are connected with each other with the oxide film 1a still existing therebetween as shown in FIG. 7(b).

Therefore, no matter how hard an attempt has been made to destroy the oxide film 1a by employing the ultrasonic welding method, the swaging joint method, or the cold welding method, there still remains the highly insulating oxide film 1a between the aluminum 1b and the aluminum 3a, as shown in FIG. 7(b). Accordingly, a perfect connecting condition cannot prevail over the entire contact area between the aluminum 1b and the aluminum 3a, thus creating a resistance therebetween and presenting a problem. The problem of such an imperfect connection as above tends to be multiplied as an aluminum electrolytic capacitor is made smaller in size and larger in capacitance.

More specifically, when an aluminum electrolytic capacitor is made smaller in size, an anode foil of larger capacitance must be used. When an anode foil is made larger in capacitance, the surface roughness of the anode foil generally increases, resulting in a condition where minute recesses and projections are present throughout the surface. When this anode foil of large capacitance is used and the connection between the anode foil 1 and the lead 3 is established by the use of the foregoing ultrasonic welding method, swaging joint method or cold welding method, fine particles of the oxide film 1a, produced by the destruction of the oxide film 1a, remain between the aluminum 1b and the aluminum 3a in a substantial quantity. As a result, only a partial connection is established between aluminum 1a and 3a. Thus, a problem of imperfect connection due to a substantial number of crevices created between the aluminum 1b and the aluminum 3a occurs.

When an aluminum electrolytic capacitor is produced under the condition that the aluminum 1b and the aluminum 3a are connected with each other imperfectly as described above, a resistance at the junction increases to a magnitude that a large ripple current is incapable of flowing through the capacitor. Thereby a restriction to the permissible ripple current, which is a very important electrical property of an aluminum electrolytic capacitor, occurs.

With respect to the reliability of an aluminum electrolytic capacitor using a large capacitance anode foil for miniaturization, existence of a substantial number of crevices between the aluminum 1b and the aluminum 3a together with ripple currents and hot or cold stresses applied to the capacitor for a long period of time, lead to forming of cracks on the surface of the junction. And, therefore, it is anticipated that the dangers of the aforementioned crevices when exposed externally will multiply.

An electrolyte, with which the capacitor element 5 is impregnated, infiltrates into the numerous crevices exposed externally and the infiltrated electrolyte changes the surface of the aluminum inside of the crevices into an electrically insulating oxide aluminum film by an oxidizing action thereof. As a result, the junction between the aluminum 1b and the aluminum 3a experiences an increase in resistance and near the extreme ends the resistance has an appearance of being open-circuited, thereby seriously damaging the reliability of the aluminum electrolytic capacitor.

Additionally, when similar miniaturization of a high voltage aluminum electrolytic capacitor is pursued, the gravity of the problem as described above is multiplied. More specifically, an anode foil of a high withstand voltage is required for the high voltage aluminum electrolytic capacitor. But, due to a substantial thickness of the oxide film on the anode foil, debris of an oxide film 1a created by the destruction of oxide film 1a remains thick between the aluminum 1b and the aluminum 3a when compared with the anode foil 1 for a low operating voltage. This results in an increase of the seriousness of the aforementioned problem.

SUMMARY OF THE INVENTION

The present invention deals with the problems involved with prior art aluminum electrolytic capacitors and aims to provide an aluminum electrolytic capacitor realizing a reduction in size, a high ripple-current carrying capacity, and exhibiting low resistance characteristics without a loss in performance, such as high quality and high reliability and provides a manufacturing method thereof.

In order to deal with the foregoing problems, an aluminum electrolytic capacitor of the present invention uses an electrode foil, on part of a surface free of an oxide film and connected with an external lead. And, the present invention proposes a manufacturing method for making these capacitors.

Accordingly, since the lead is connected to an area on the surface of the anode foil where no oxide film exists, no broken pieces of the oxide film produced at the time of connection exist between the foil's aluminum and the lead's aluminum. As a result, not only the conventional ultrasonic welding method, sawing joint method and cold welding method but also an electrical and gas welding method such as a resistance welding method, arc welding method and a thermal welding method such as a laser welding method and the like can be used, which before now have been impossible to use. The contact resistance at the lead connecting area is further reduced and a better connection is made, thereby enhancing the quality/reliability of the capacitor and enabling the realization of an aluminum electrolytic capacitor with a smaller size and a higher ripple-current carrying capability with lower resistance.

As described above, the aluminum electrolytic capacitor of the present invention has the lead thereof connected to the surface of the anode foil at a place where no oxide film exists and, therefore, the broken pieces of the oxide film produced at the time of joining and existing between the anode foil's aluminum and the lead's aluminum are not present, thereby realizing an almost perfect joint between the anode foil's aluminum and the lead's aluminum. As a result, the resistance between the anode foil and the lead is further reduced when using an anode foil of large capacity and a high withstand voltage. And the aluminum electrolytic capacitor for realizing further enhancement of the quality/reliability, a reduction in size, and higher ripple-current carrying capacity and lower dissipation can be obtained.

BRIEF DESCRIPTION OF THE DRAWINGS

FIG. 1(*b*) is a cross-sectional view of the aluminum foil of FIG. 1(*a*) after the anode foil and the lead have been joined together.

FIG. 2(*b*) is a cross-sectional view of the aluminum foil of FIG. 2(*a*) after the etching treatment.

FIG. 2(*c*) is a cross-sectional view of the aluminum foil of FIG. 2(*a*) after the anode oxidizing treatment.

FIG. 2(*d*) is a cross-sectional view of the aluminum foil of FIG. 2(*a*) after a mask elimination process has been performed.

FIG. 2(*e*) is a cross-sectional view of the aluminum foil of FIG. 2(*a*) after a lead connecting process has been performed.

FIG. 3(*b*) is a cross-sectional view of the aluminum foil of FIG. 3(*a*) after an anode anodizing treatment.

FIG. 3(*c*) is a cross-sectional view of the aluminum foil of FIG. 3(*a*) after a mask elimination process has been performed.

FIG. 3(*d*) is a cross-sectional view of the aluminum foil of FIG. 3(*a*) after a lead connecting process has been performed.

FIG. 7(*b*) is a cross-sectional view of the prior art aluminum foil of FIG. 7(*a*), showing the anode foil and lead after both have been joined together.

DESCRIPTION OF THE PREFERRED EMBODIMENTS

THE FIRST EXEMPLARY EMBODIMENT

Figure 1A:
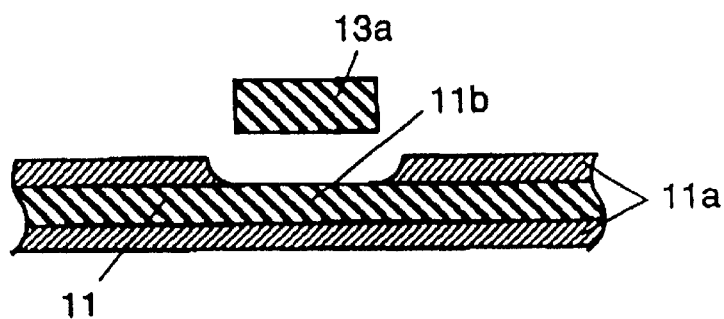
FIG. 1(*a*) is a cross-sectional view of an aluminum foil in a first exemplary embodiment of the present invention, showing an anode foil and a lead before both are joined together.
Figure 1B:
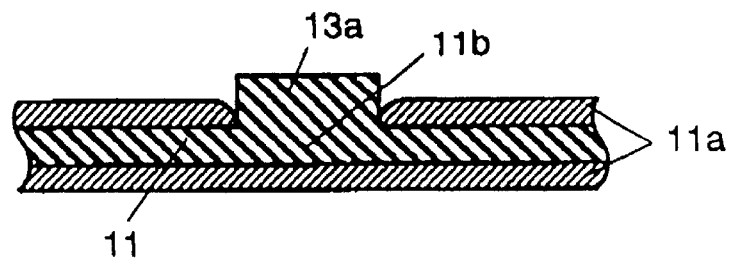

FIG. 1(*a*) and FIG. 1(*b*) are partial cross-sectional views of an aluminum foil in a first exemplary embodiment of the present invention, showing how an electrode foil and a lead are joined together. As shown in FIG. 1, the aluminum electrolytic capacitor of the present invention uses an anode foil 11 with intensive surface roughness, high capacitance and a high withstand voltage. An aluminum part 13*a* of a lead 13 (not shown) is joined to the anode foil 11 at a lead connecting place 11*b* where an oxide film 11*a* has been removed.

More specifically, the aluminum electrolytic capacitor and a manufacturing method thereof employ a method of using a cutting blade, which is one of the mechanical elimination methods for removing the oxide film 11*a* formed on part of the surface of the anode foil 11, thus providing the lead connecting place 11*b* on the surface of the anode foil 11. And this embodiment also employs an ultrasonic welding method for connecting the aluminum part 13*a* of the lead 13 to the lead connecting place 11*b*.

By employing the construction and manufacturing method as described above, perfect connection is established between the aluminum part 13*a* and the lead connecting place 11*b* since no oxide film 11*a* exists at the lead connecting place 11*b*. This makes it possible to obtain an aluminum electrolytic capacitor with an extremely reliable connection.

THE SECOND EXEMPLARY EMBODIMENT

FIG. 1(*a*) and FIG. 1(*b*) also show partial cross-sectional views of an aluminum electrolytic capacitor in a second exemplary embodiment of the present invention. The elimination of the oxide film 11*a* is now performed by a chemical treatment using alkaline solution, which is a chemical elimination method, and then the aluminum part 13*a* is connected to the lead connecting place of the anode foil 11 using an ultrasonic welding method. The manufacturing method of the present exemplary embodiment is similar to the first exemplary embodiment except for the use of a chemical elimination method as taught above. Therefore, a detailed description of the present exemplary embodiment is omitted.

THE THIRD EXEMPLARY EMBODIMENT

FIG. 2 shows partial cross-sectional views of an aluminum electrolytic capacitor in a third exemplary embodiment of the present invention. The anode foil 11 differs from the one in the first exemplary embodiment in not having any etching pits and oxide film 11a from the beginning on the lead connecting place 11b and being kept that way. Then the aluminum part 13a is connected to the lead connecting place 11b.

Figure 2A:
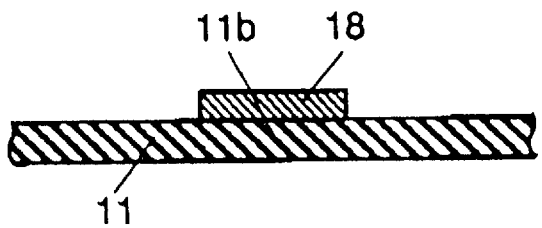
FIG. 2(*a*) is a cross-sectional view of an aluminum foil in a third exemplary embodiment of the present invention, showing an anode foil before the application of an etching treatment and an anode oxidization treatment and after a masking process has been performed.
Figure 2B:
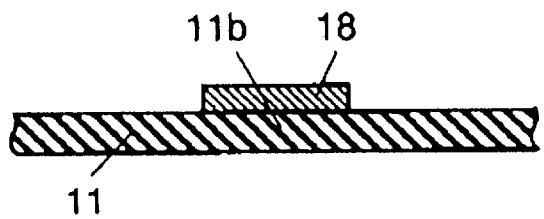
Figure 2C:
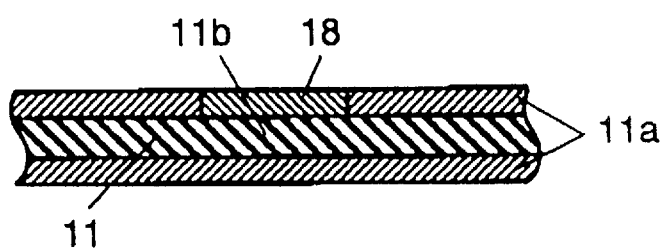
Figure 2D:
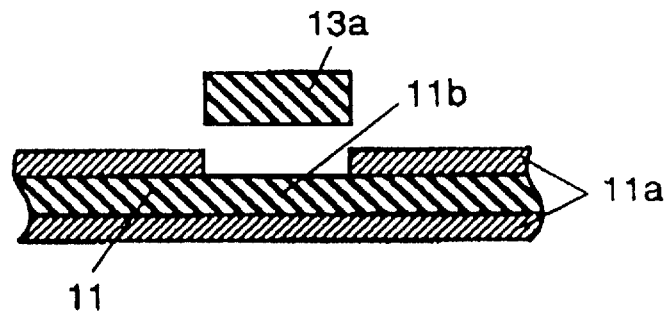
Figure 2E:
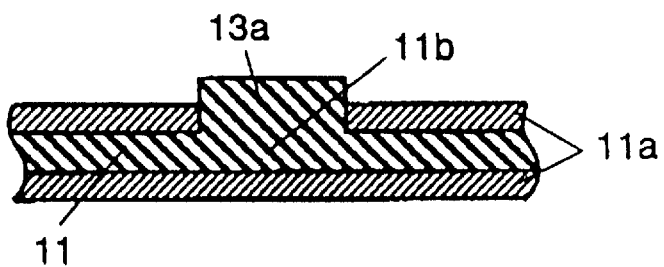
Figure 3A:
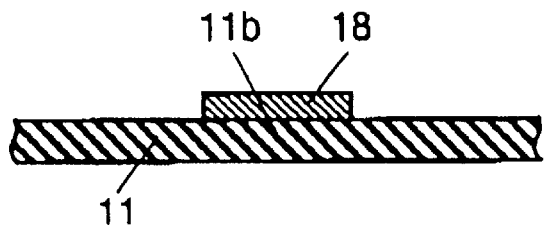
FIG. 3(*a*) is a cross-sectional view of an aluminum foil in a fourth exemplary embodiment of the present invention, showing an anode foil with an etching treatment applied thereto and after a masking process has been performed.
Figure 3B:
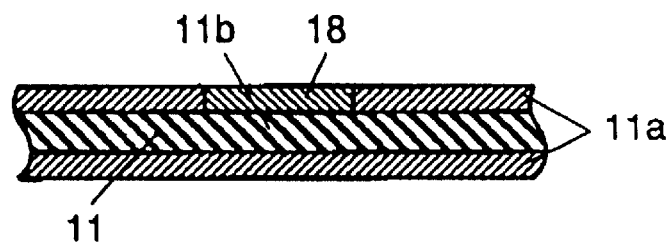
Figure 3C:
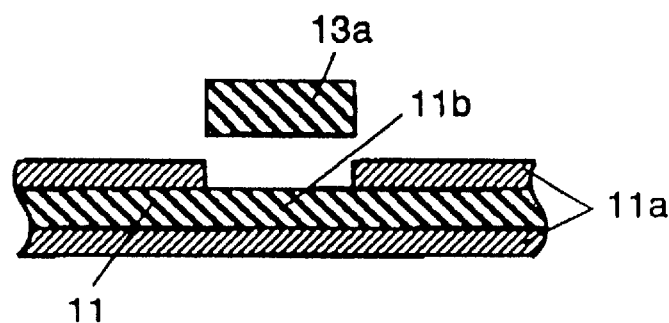
Figure 3D:
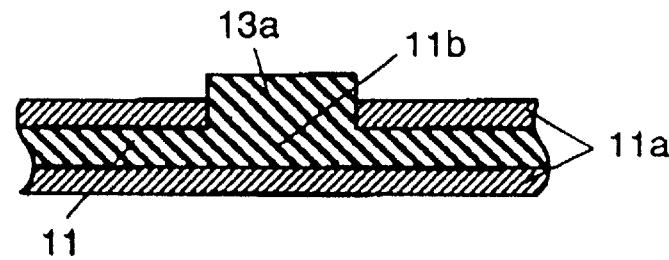

More specifically, as shown in FIG. 2(a), a masking 18 is applied to the anode foil 11 at the lead connecting place 11b before surface roughening of the anode foil 11 by an etching. And then etching pits and oxide film 11a are formed on the anode foil 11 except for the area applied with the masking 18 by an etching treatment and anodizing (FIG. 2(b)). As a result, no etching pits and oxide film are formed in the lead connecting place 11b (FIG. 2(c)). The aluminum part 13a is connected to the lead connecting place 11b and prepared according to the method as described above by an ultrasonic welding (FIG. 2(d)), thus manufacturing the aluminum electrolytic capacitor of the present exemplary embodiment.

THE FOURTH EXEMPLARY EMBODIMENT

FIG. 3 shows partial cross-sectional views of an aluminum electrolytic capacitor in a fourth exemplary embodiment of the present invention, in which the masking 18 is applied under the condition that etching pits have been formed but, no oxide film 11a has been formed on the lead connecting place 11b, and application of masking 18 the oxide film 11a is formed.

More specifically, as shown in FIG. 3 (a), the masking 18 is applied to the lead connecting place 11b of the anode foil 11 after surface roughening of the foil 11, thereby protecting the lead connecting place 11b from being covered by the oxide film 11a (FIG. 3 (b)) when it is formed. Next, the masking 18 is removed in the same way as in the foregoing third exemplary embodiment (FIG. 3 (c)). Then, the aluminum part 13a is connected to the lead connecting place 11b (FIG. 3 (d)), thus formulating a manufacturing method of the aluminum electrolytic capacitor of the present exemplary embodiment.

THE FIFTH EXEMPLARY EMBODIMENT

Figure 4A:
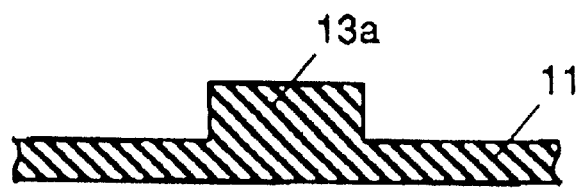
FIG. 4 is a cross-sectional view of the aluminum foil in an exemplary embodiment of the present invention.
Figure 4B:
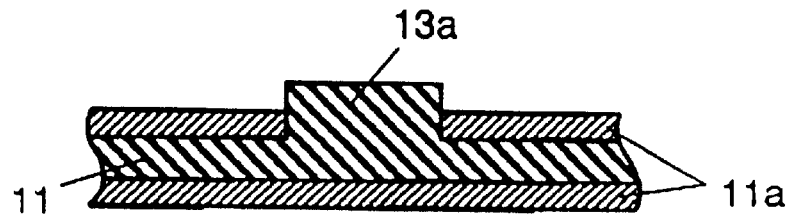

FIG. 4 shows partial cross-sectional views of an aluminum electrolytic capacitor in a fifth exemplary embodiment of the present invention, in which in order to realize the condition that the etching pits and oxide film 11a are prevented from being formed on the lead connecting place 11b as in the foregoing third exemplary embodiment, the aluminum part 13a is connected to the lead connecting place 11b by employing an ultrasonic welding method before an etching and an anodizing treatment are applied thereto. The present exemplary embodiment is similar to the third exemplary embodiment and a detailed description thereof is omitted.

THE SIXTH EXEMPLARY EMBODIMENT

FIG. 1 also shows partial cross-sectional views of an aluminum foil in a sixth exemplary embodiment of the present invention, in which a conductive polymer is filled in a place, where the oxide film 11a is removed in the foregoing first exemplary embodiment, thereby forming the lead connecting place 11b to be connected with the lead 13. The aluminum part 13a of the lead 13 is connected to the lead connecting place 11b by employing an ultrasonic welding method, thus formulating the manufacturing method of the aluminum electrolytic capacitor of the present exemplary embodiment. The present exemplary embodiment is similar to the first exemplary embodiment and therefore a detailed description thereof is omitted.

THE SEVENTH EXEMPLARY EMBODIMENT

FIG. 1 also shows partial cross-sectional views of an aluminum foil in a seventh exemplary embodiment of the present invention. An aluminum is melted and removed from the inside of a place where the oxide film 11a is removed by an application of heat thereto and the molten aluminum is made to fill in the place where the oxide film 11a is eliminated, thereby forming the lead connecting place 11b. The aluminum part 13a of the lead 13 is connected to the lead connecting place 11b by employing an ultrasonic welding method, thus formulating the manufacturing method of the aluminum electrolytic capacitor of the present exemplary embodiment. The present exemplary embodiment is similar to the first exemplary embodiment and therefore a detailed description thereof is omitted.

THE EIGHTH EXEMPLARY EMBODIMENT

FIG. 1 also shows partial cross-sectional views of an aluminum foil in an eighth exemplary embodiment of the present invention, in which the method of connecting the lead 13 to the lead connecting place 11b is replaced by a laser welding which is one of a fusion type welding method, thus formulating the manufacturing method of the aluminum electrolytic capacitor of the present exemplary embodiment. The present exemplary embodiment is similar to the first exemplary embodiment and therefore a detailed description thereof is omitted.

THE NINTH EXEMPLARY EMBODIMENT

FIG. 1 also shows partial cross-sectional views of an aluminum foil in a ninth exemplary embodiment of the present invention, in which the method of connecting the aluminum part 13a to the lead connecting place 11b is replaced by a resistance welding which is a type of a pressure welding method, thus formulating the manufacturing method of the aluminum electrolytic capacitor of the present exemplary embodiment. The present exemplary embodiment is similar to the first exemplary embodiment and therefore a detailed description thereof is omitted.

THE TENTH EXEMPLARY EMBODIMENT

FIG. 1 also shows partial cross-sectional views of an aluminum foil in a tenth exemplary embodiment of the present invention, in which the method of connecting the aluminum part 13a to the lead connecting place 11b is replaced by a conductive adhesive joint method which is a type of adhesive joint method, thus formulating the manufacturing method of the aluminum electrolytic capacitor of the present exemplary embodiment. The present exemplary embodiment is similar to the first exemplary embodiment and therefore a detailed description thereof is omitted.

THE ELEVENTH EXEMPLARY EMBODIMENT

FIG. 1 also shows partial cross-sectional views of an aluminum electrolytic capacitor in an eleventh exemplary embodiment of the present invention, in which the method of connecting the aluminum part 13a to the lead connecting place 11b is replaced by a swaging joint method which is one of a mechanical joint method, thus formulating the manufacturing method of the aluminum electrolytic capacitor of the present exemplary embodiment. The present exemplary embodiment is similar to the first exemplary embodiment and therefore a detailed description thereof is omitted.

COMPARATIVE EXAMPLE

A prior art aluminum electrolytic capacitor was prepared by using the same anode foil 11 as used in the foregoing first exemplary embodiment with the oxide film 11a on the surface thereof left intact. The anode foil 11 and the aluminum part 13a were welded using the same ultrasonic welding method as used in the first exemplary embodiment. And the first exemplary embodiment was used as the reference sample for comparison.

Then, one thousand pieces each of the aluminum electrolytic capacitors are prepared according to the manufacturing methods as described in the first exemplary embodiment through the eleventh exemplary embodiment and each respective anode foil 11 and lead 13 are connected with each other, thereby confirming the effects thereof. The results confirmed accordingly are as shown in Table 1 below.

TABLE 1

| Exemplary Embodiment | Number of Defects (rates) | Contact Resistance (Ω) |
|---|---|---|
| First | 0/1000 (0%) | 0.488 in average<br>σ = 0.097 |
| Second | 0/1000 (0%) | 0.445 in average<br>σ = 0.088 |
| Third | 0/1000 (0%) | 0.437 in average<br>σ = 0.085 |
| Fourth | 0/1000 (0%) | 0.441 in average<br>σ = 0.085 |
| Fifth | 0/1000 (0%) | 0.449 in average<br>σ = 0.089 |
| Sixth | 0/1000 (0%) | 0.510 in average<br>σ = 0.10 |
| Seventh | 0/1000 (0%) | 0.472 in average<br>σ = 0.095 |
| Eighth | 0/1000 (0%) | 0.495 in average<br>σ = 0.10 |
| Ninth | 0/1000 (0%) | 0.522 in average<br>σ = 0.011 |
| Tenth | 0/1000 (0%) | 0.543 in average<br>σ = 0.13 |
| Eleventh | 0/1000 (0%) | 0.497 in average<br>σ = 0.099 |
| Comparative example | 842/1000 (84.2%) | 1.97 in average<br>σ = 0.37 |

In Table 1, the number of defects reflects the number of tested capacitors that have shown physical failure in connections and the contact resistance defines an average resistance measured between the anode foil 11 and the lead 13 with 50 capacitors sampled for each exemplary embodiment.

As clearly seen in Table 1, perfect connection between the lead connecting place 11b and the aluminum part 13a is obtained even when a high capacity and high withstand voltage anode foil is used as the anode foil 11. Because the aluminum electrolytic capacitors according to First Exemplary Embodiment through Eleventh Exemplary Embodiment have no oxide film 11a on the surface of an anode foil 11 disposed on a lead connecting place 11b, to which an aluminum part 13a of a lead 13 is connected. There cannot exist any broken pieces of the oxide film 11a produced at the time of connection as experienced with the prior art aluminum electrolytic capacitors between the lead connecting place 11b and the aluminum part 13a. In addition, Table 1 shows that both the average contact resistance and the extent of distribution thereof are small and stable for every category of the exemplary embodiments.

Figure 5:
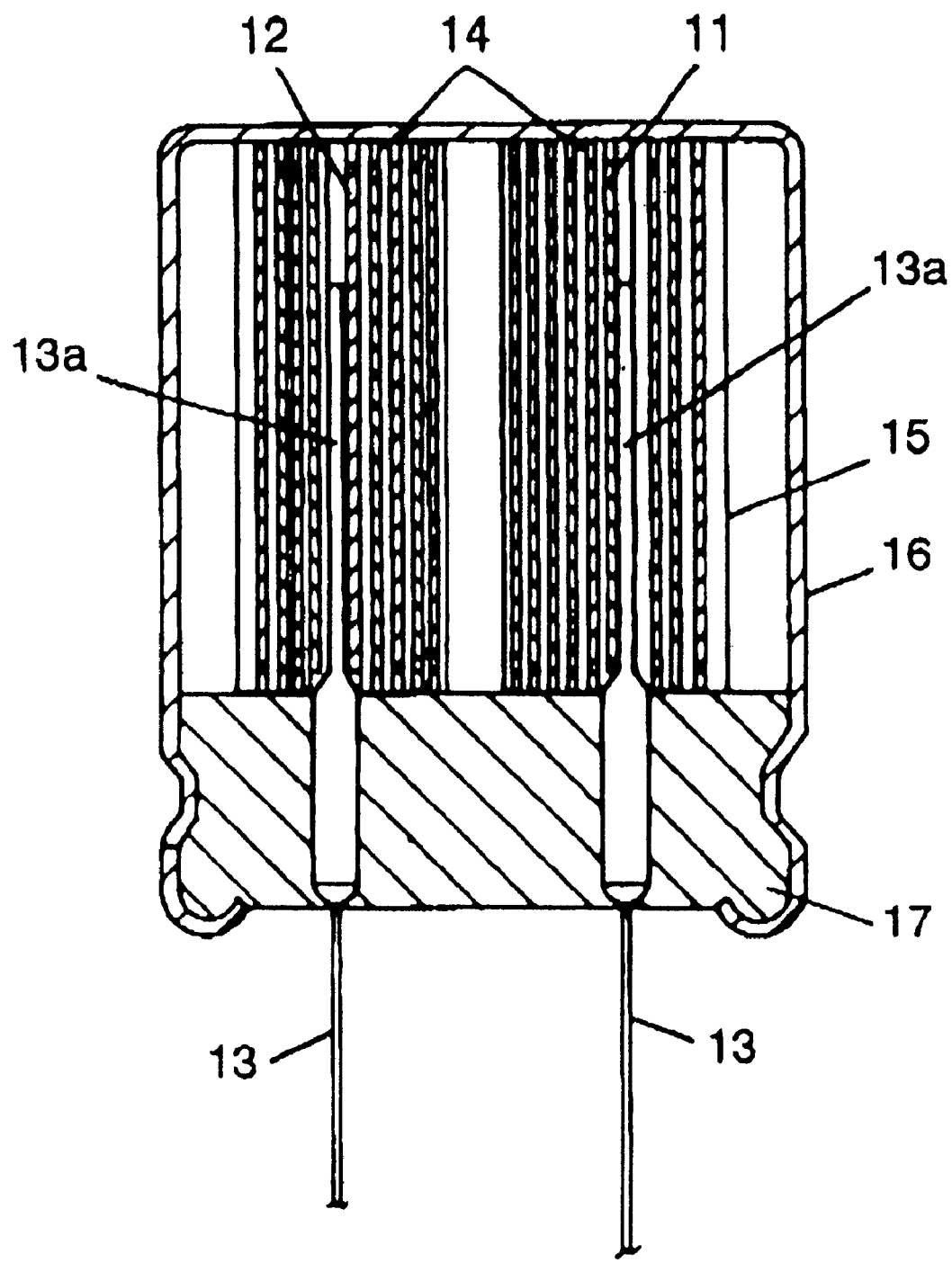
FIG. 5 is a cross-sectional view of an aluminum electrolytic capacitor in an exemplary embodiment of the present invention.
Figure 6:
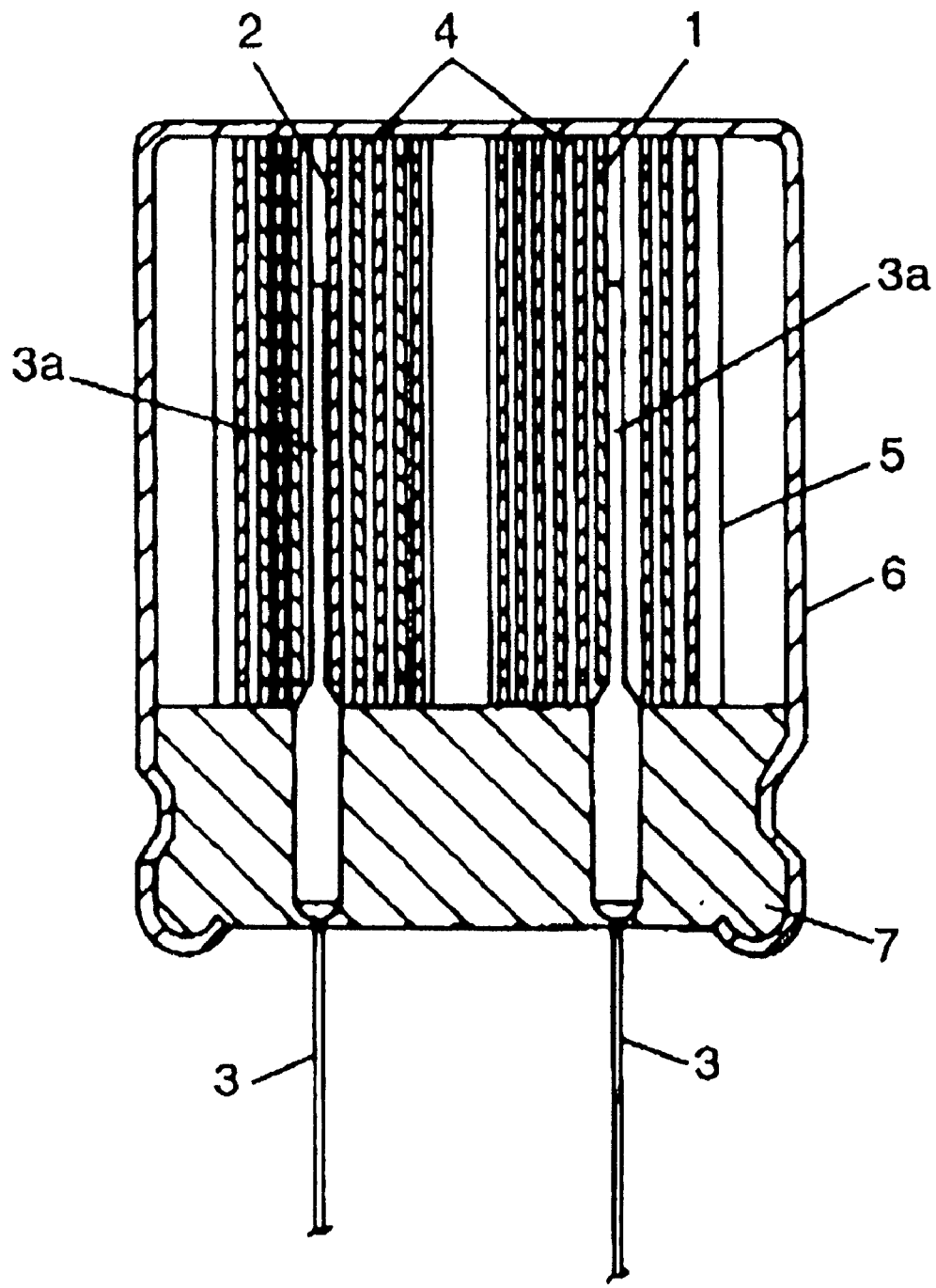
FIG. 6 is a cross-sectional view of a prior art aluminum electrolytic capacitor.
Figure 7A:
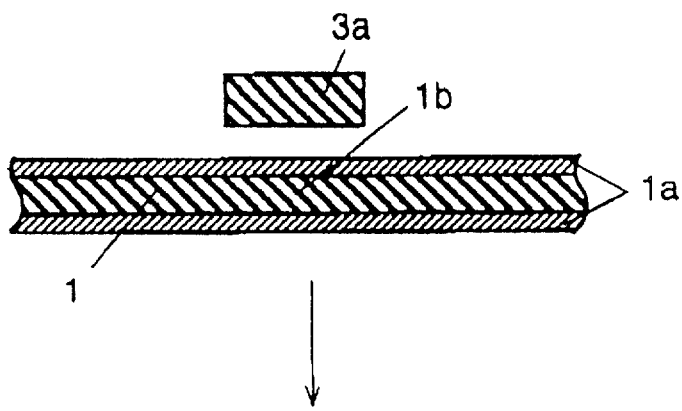
FIG. 7(*a*) is a cross-sectional view of a prior art aluminum electrolytic capacitor, showing an anode foil and a lead before both have been joined together.
Figure 7B:
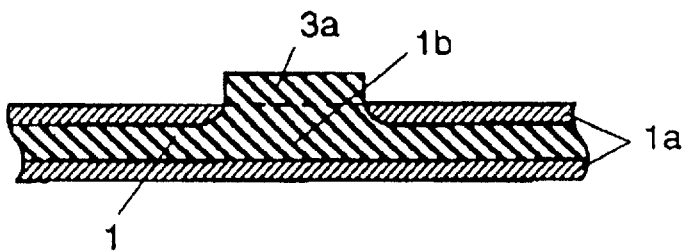
Figure 8:
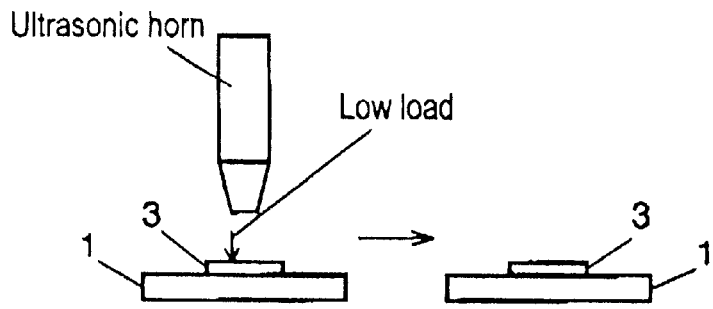
FIG. 8 is a schematic sketch of connecting according to an ultrasonic welding method.
Figure 9:
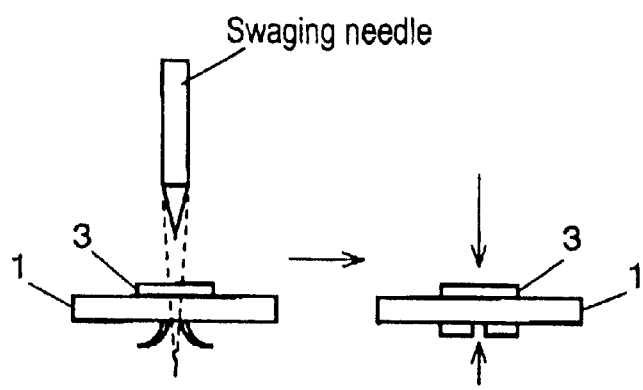
FIG. 9 is a schematic sketch of connecting according to a swaging joint method.
Figure 10:
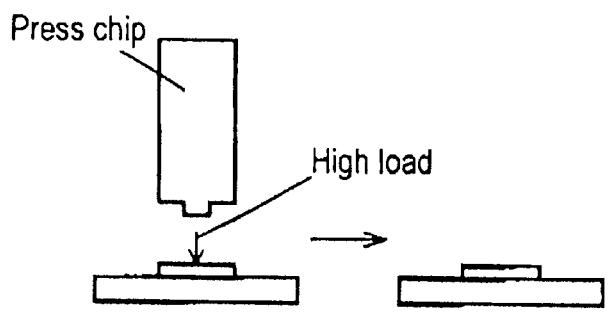
FIG. 10 is a schematic sketch of connecting according to a cold welding method.

A variety of aluminum electrolytic capacitors, as shown in FIG. 5 respectively, have been prepared using the anode foils 11 as shown in Table 1 with leads 13 connected thereto. In FIG. 5, a capacitor element 15 comprises the anode foil 11, cathode foil 12, lead 13 connected thereto, respectively, and a separator 14 disposed between the foregoing anode foil 11 and cathode foil 12, and then the capacitor element 15 is impregnated with a driving electrolyte, which is not shown in FIG. 4, and accommodated in a bottomed tubular metal case 16 with the opening thereof closed by sealing material 17. Also, a reference sample aluminum electrolytic capacitor has been similarly prepared using the anode foil of Table 1.

Fifty pieces each of the 50 V 10 μF aluminum electrolytic capacitors of the first to eleventh exemplary embodiments of the present invention and the reference sample have been produced and subjected to a ripple current load test at 105° C. to see changes in tan δ. Test results are as shown in Table 2 below.

TABLE 2

| Exemplary Embodiment | tan δ | |
|---|---|---|
| | Initial Value | After 2000 h |
| First | 0.023 in average<br>σ = 0.0013 | 0.045 in average<br>σ = 0.0028 |
| Second | 0.022 in average<br>σ = 0.0013 | 0.044 in average<br>σ = 0.0026 |
| Third | 0.021 in average<br>σ = 0.0012 | 0.042 in average<br>σ = 0.0025 |
| Fourth | 0.022 in average<br>σ = 0.0013 | 0.042 in average<br>σ = 0.0026 |
| Fifth | 0.022 in average<br>σ = 0.0013 | 0.042 in average<br>σ = 0.0025 |
| Sixth | 0.024 in average<br>σ = 0.0014 | 0.046 in average<br>σ = 0.0028 |
| Seventh | 0.022 in average<br>σ = 0.0012 | 0.042 in average<br>σ = 0.0025 |
| Eighth | 0.023 in average<br>σ = 0.0013 | 0.045 in average<br>σ = 0.0031 |
| Ninth | 0.025 in average<br>σ = 0.0015 | 0.048 in average<br>σ = 0.0031 |
| Tenth | 0.026 in average<br>σ = 0.0015 | 0.049 in average<br>σ = 0.0033 |
| Eleventh | 0.023 in average<br>σ = 0.0014 | 0.045 in average<br>σ = 0.0030 |
| Comparative | 0.047 in average<br>σ = 0.0081 | 0.244 in average<br>σ = 0.059 |

As clearly seen in Table 2, the aluminum electrolytic capacitors in the first exemplary embodiment to the eleventh exemplary embodiment of the present invention show low average values in tan δ even under the long ripple load test at 105° C. for 2000 hours. Additionally, the average values exhibit a narrow and consistent range of variation. The connection between the lead connecting place 11b and the aluminum part 13a is performed perfectly, thereby completely eliminating the danger of an increase in contact resistance and a deterioration in connection between the anode foil 11 and the lead 13. Nothing suggests an infiltration of electrolyte into the connecting place and thus, a high degree of reliability in connection is assured.

According to the present invention, the anode foil 11 and the lead 13 are perfectly connected with each other at the place where they come into contact with each other, thus further reducing the contact resistance between them. And it makes the connection more perfect not only with resulting enhancement in quality and reliability of the aluminum electrolytic capacitor but also with the resultant possibility of further realizing a reduction in size, high ripple-current carrying and a low contact resistance.

Although descriptions have been made in the foregoing exemplary embodiments on the case where a cutting method, which is one of the mechanical elimination methods, was used to form the lead connection place 11b on the anode foil 11, it is needless to say that cutting or destroying of the etching pits and oxide films 11a according to other mechanical elimination methods can be equally well employed with the same resulting effects. More specifically, such other mechanical elimination methods include a method of using a file and a method using abrasives.

The specific methods to remove a oxide film 11a include a method of bending a part of the electrode foil 11, from which an oxide film is desired to be eliminated, a plurality of times, a method of applying a heat shock to the foregoing part, and a method of crushing the foregoing part by applying a localized load. When a mechanical method of eliminating an oxide film, such as cutting, grinding away, destruction and the like as describe above, it is possible to eliminate the oxide film 11a more perfectly by using together a method of blowing off the eliminated film 11a by applying a pressured gas thereto. In addition, when a method of removing the eliminated oxide film 11a by suction or adhesion is used together, it is possible to prevent the eliminated oxide film 11a from being attached again to the lead connecting place 11b and also to prevent production facilities from becoming contaminated and damaged.

Although a description has been made in the foregoing exemplary embodiment of the case where the method of eliminating the oxide film 11a was a chemical processing method using alkaline solution, which is one of the chemical elimination methods, it is needless to say that the same configuration as above can be employed to achieve the same effects by employing a chemical processing method using acid, which is another chemical elimination method.

A description has been made in the foregoing exemplary embodiment on the method of forming the lead connecting place 11b by filling a conductive polymer in the place where the oxide film 11a has been eliminated, and this method is effective with a high capacitance foil, in which the anode foil 11 has much increased surface roughness.

More specifically, as the surface roughness of the anode foil 11 increases, the thickness of the aluminum layer in the center of the anode foil 11 becomes thinner, and even if the connection is perfect due to the elimination of the oxide film 11a, the connecting strength between the lead 13 and the lead connecting place 11b is reduced because of the reduced thickness of the anode foil 11, to which the aluminum part 13a of the lead 13 is connected. Therefore, the method of filling a conductive polymer in the place where the oxide film 11a has been eliminated solves the foregoing problem of a reduced mechanical strength. Because the filling of the conductive polymer results in making the connecting part between the lead connecting place 11b and the lead 13 thicker, thereby improving the connecting strength therebetween.

Although the above description deals with the case where a conductive polymer is used, it is needless to say that the same configuration can be employed even when a metal or a conductive resin is used replacing the conductive polymer and the same effect can be expected.

Although nothing in particular has been mentioned with regard to the surface configuration of the place where the oxide film 11a was eliminated in the foregoing exemplary embodiment. By having made the surface configuration of the place where the oxide film 11a is removed to be like the surface configuration of the aluminum part 13a of the lead 13, more intensified connection therebetween can be realized.

More specifically, when the aluminum part 13a is flat in shape, the place where the oxide film 11a was eliminated is made flat in shape. When the aluminum part 13a of the lead 13 shows a circular arc protruded configuration in a cross-sectional view thereof, the place where the oxide film 11a was eliminated is also made to be the same circular arc protruded configuration to have each respective contact surface conformed with each other. This enables the efficient application of connecting energy throughout the entire contacting surface when the connection takes place and the strong connection can be obtained.

As the connecting method of the lead 13, a laser welding method representing a method of connection by fusing, a resistance welding method and an ultrasonic welding method representing a method of connection by pressing and a swaging method representing a mechanical connection method are used in the foregoing exemplary embodiments, but it is needless to say that the same configuration as above can be employed with regard to other methods of connection.

Other specific methods of connection by fusing include a gas welding method using an inert gas and an arc welding method. Also, other specific methods of connection by pressing include a cold welding method.

Other specific methods of mechanical connection include a method whereby the aluminum part 13a is split into two along the axis line thereof and the lead connecting place 11b is held on both the front and back surfaces thereof by those split aluminum parts 13 of the lead 13.

Although each respective method of connection has been described individually in the foregoing exemplary embodiment, it is needless to say that the use of such respective methods of connection in combination with other methods of connection makes it possible to have the features of various methods of connection mixed to achieve the optimum performance of connection.

More specifically, by taking it into consideration the fact that the ultrasonic welding method and the cold welding method are relatively advantageous in terms of an electrically excellent joint and the swaging joint method is relatively advantageous in terms of a physically excellent joint, a swaging joint method used in combination with an ultrasonic welding method or a cold welding method makes it possible for the joint thus performed to have both features of electrically excellent connection and physically excellent connection, thereby enabling the realization of more perfect connections.

Although the lead 13 is kept at room temperature when the ultrasonic welding is performed in the foregoing exemplary embodiment, the lead 13 when warmed in advance allows the required welding period to be short and also allows the distribution of variation in the joint strength to be small. This is because of a small amount of ultrasonic welding energy required when the lead 13 is heated in advance for one reason and because of a stabilized welding condition unaffected by the change in ambient temperature since the temperature of the lead 13 can be controlled to a predetermined temperature by heating in advance for the other reason.

In general, an anode foil is produced in an original wide and long sheet form and then cut into a required width and a length to make an anode foil 11 for a capacitor. An oxide film 11a is formed on the surface of the anode foil 11 but the oxide film 11a is sometimes missing from the entire cutting surface depending on the condition of the foil cutting. In this case, by connecting a lead 13 to the foregoing cutting surface, it is needless to say that the same effect as experienced in the foregoing exemplary embodiment can be expected.

Although a description has been made in the foregoing exemplary embodiment on the case where the electrode foil is an anode foil 11 with rather a thick oxide film 11a comprised, it is needless to say that the same configuration as above can be applied to a cathode foil 12, on which a thin naturally created oxide film or something like that is formed, and the same effect can be expected.

As described in the above, because of the elimination of the oxide film 11a from the electrode foil surface, the aluminum electrolytic capacitor can not only be improved in performance, quality and reliability but also the lead 13 can be connected by using an electric welding such as a resistance welding, an arc welding method and the like, a gas welding method, a laser welding method and the like that have been considered unusable, thereby increasing the freedom of choice in production method and resulting in a financial advantage. Therefore, it is obvious that the present invention discloses technologies superior to prior art technologies.

What is claimed is:

1. A manufacturing method of an aluminum electrolytic capacitor comprising:

removing an oxide film from a connecting area on part of a surface of each of an anode electrode foil and a cathode electrode foil;

connecting a lead to each of said connecting areas;

preparing a capacitor element by winding said electrode foils; and containing and sealing said capacitor element in a bottomed metal case having a bottom together with a driving electrolyte.

2. The manufacturing method of an aluminum electrolytic capacitor according to claim 1, further comprising eliminating said oxide film from said connecting area by a mechanical method selected from the group consisting of cutting, grinding away and destruction, and any combination thereof.

3. The manufacturing method of an aluminum electrolytic capacitor according to claim 1, further comprising filling the area free of said oxide film with a material selected from the group consisting of a metal, a conductive polymer and a conductive resin, to form an area for connecting a lead.

4. The manufacturing method of an aluminum electrolytic capacitor according to claim 1, further comprising eliminating an oxide film from the surface of an electrode foil, and filling molten aluminum into said connecting area where the oxide film has been eliminated.

5. The manufacturing method of an aluminum electrolytic capacitor according to claim 1, further comprising connecting a lead to said connecting area with a mechanical connecting method selected from the group consisting of welding, pressure joining, swaging and any combination thereof.

6. The manufacturing method of an aluminum electrolytic capacitor according to claim 5, wherein connecting a lead comprises swaging combined with one of ultrasonic welding and cold welding.

7. The manufacturing method of an aluminum electrolytic capacitor according to claim 1, wherein said connecting a lead having a lengthwise axis further comprises splitting one end of the lead into two parts along the lengthwise axis thereof, and connecting said two parts to the lead connecting area of the electrode foil.

8. The manufacturing method of an aluminum electrolytic capacitor according to claim 1, further comprising pre-heating the lead and connecting the pre-heated lead to the connecting area with ultrasonic welding.

9. The manufacturing method of an aluminum electrolytic capacitor according to claim 1, wherein connecting a lead comprises connecting to a cutting surface of the electrode foil.

10. The aluminum electrolyte capacitor according to claim 1, wherein said portion is pitted and the surface of such pits is not susceptible to formation of oxide film thereon.

11. The manufacturing method of an aluminum electrolytic capacitor according to claim 1, further comprising removing an oxide film by applying a heat shock to the oxide film.

12. The manufacturing method of an aluminum electrolytic capacitor according to claim 2, further comprising removing by absorbing, debris of an oxide film created as a result of applying said mechanical method to an electrode foil to eliminate said oxide film.

13. The manufacturing method of an aluminum electrolytic capacitor according to claim 2, further comprising removing by adhesive means, debris of an oxide film created as a result of applying said mechanical method to an electrode foil to eliminate said oxide film.

* * * * *

UNITED STATES PATENT AND TRADEMARK OFFICE
CERTIFICATE OF CORRECTION

PATENT NO. : 6,652,604 B1
DATED : November 25, 2003
INVENTOR(S) : Takumi Nakata et al.

It is certified that error appears in the above-identified patent and that said Letters Patent is hereby corrected as shown below:

Column 11,
Line 33, change "removing" to -- eliminating --;
Line 36, delete in its entirety and replace with -- connecting one lead to the connecting area of the anode electrode fail and another lead to the connecting area of the cathode electrode foil; --; and
Lines 40-41, delete "bottomed".

Signed and Sealed this

Thirty-first Day of August, 2004

JON W. DUDAS
*Director of the United States Patent and Trademark Office*